United States Patent

Nakayama

(10) Patent No.: US 10,182,166 B2
(45) Date of Patent: Jan. 15, 2019

(54) IMAGE PROCESSING DEVICE, IMAGE PROCESSING METHOD, AND IMAGE FORMING APPARATUS FOR OVERWRITING A SETTING

(71) Applicant: FUJI XEROX CO., LTD., Tokyo (JP)

(72) Inventor: Hiroyoshi Nakayama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/354,331

(22) Filed: Nov. 17, 2016

(65) Prior Publication Data

US 2017/0366691 A1 Dec. 21, 2017

(30) Foreign Application Priority Data

Jun. 17, 2016 (JP) ................................ 2016-120600

(51) Int. Cl.
*G06F 3/12* (2006.01)
*H04N 1/00* (2006.01)

(52) U.S. Cl.
CPC ..... *H04N 1/00506* (2013.01); *H04N 1/00204* (2013.01); *H04N 1/00411* (2013.01); *H04N 1/00432* (2013.01)

(58) Field of Classification Search
CPC ........... H04N 1/00506; H04N 1/00204; H04N 1/00411; H04N 1/00432; G06F 3/1204; G06F 3/1205; G06F 3/1257; G06F 3/1285; G06F 3/1253
USPC ................................................. 358/1.1–1.18
See application file for complete search history.

(56) References Cited

U.S. PATENT DOCUMENTS

| | | | |
|---|---|---|---|
| 6,149,323 A | 11/2000 | Shima | |
| 7,990,568 B2* | 8/2011 | Lee | G06F 3/1205 358/1.18 |
| 8,243,324 B2* | 8/2012 | Nakagiri | B41J 11/42 101/113 |
| 8,634,102 B2* | 1/2014 | Shiohara | G06F 3/1203 101/484 |
| 2012/0243024 A1* | 9/2012 | Miyata | H04N 1/00244 358/1.13 |
| 2015/0062633 A1* | 3/2015 | Asai | G06F 3/1236 358/1.15 |
| 2015/0302278 A1* | 10/2015 | Tanaka | H04N 1/00411 358/1.15 |
| 2017/0228112 A1* | 8/2017 | Chen | G06F 3/0482 |

FOREIGN PATENT DOCUMENTS

| | | |
|---|---|---|
| JP | H10-326167 A | 12/1998 |
| JP | H11-331446 A | 11/1999 |

* cited by examiner

*Primary Examiner* — Gabriel Garcia
(74) *Attorney, Agent, or Firm* — Oliff PLC

(57) ABSTRACT

An image processing device includes a memory and a storage controller. The memory stores a setting of an image forming process in accordance with generation of a first image formation command or an input of a command for generating the first image formation command. The storage controller causes a first setting designated as a result of a first operation to be overwritten and stored over a second setting designated as a result of a second operation and corresponding to a second image formation command. The first setting and the second setting are included in the stored setting.

7 Claims, 26 Drawing Sheets

FIG. 4

| SETTING SCREEN | | | | | |
|---|---|---|---|---|---|
| SIMPLE SETTINGS | SHEET | LAYOUT | | COLOR | IMAGE QUALITY |

RIP TYPE: [CPSI] [APPE]

SHEET SIZE: [SAME AS DOCUMENT SIZE ▷]

EXPAND/REDUCE
☑ NO  ☐ YES
☐ REDUCE ONLY

- RIP TYPE
- SHEET SIZE
- NUMBER OF COPIES
- SCREEN
- COLOR MODE
- LAYOUT
- SHEET TRAY

[OK] — A1
[CANCEL] — A2
[PREVIEW] — A3

FIG. 6

| COMMAND DATA LIST | | | | | | |
|---|---|---|---|---|---|---|
| HISTORY | PENDING | WAITING TO BE PROCESSED | COMPLETED | | ERROR | |
| ID | NAME OF COMMAND DATA | SIZE | INITIATION TIME OF RECEPTION | TIME OF COMPLETION | | |
| 001 | ... | ... | ... | ... | | |
| 002 | ... | ... | ... | ... | | |
| 003 | ... | ... | ... | ... | | |
| 004 | ... | ... | ... | ... | | |
| 005 | ... | ... | ... | ... | | |
| 006 | ... | ... | ... | ... | | |

FIG. 7

| COMMAND DATA LIST | | | | | | |
|---|---|---|---|---|---|---|
| HISTORY | PENDING | WAITING TO BE PROCESSED | COMPLETED | | ERROR | |
| ID | NAME OF COMMAND DATA | SIZE | INITIATION TIME OF RECEPTION | | TIME OF COMPLETION | |
| 001 | ⋮ | ⋮ | ⋮ | | ⋮ | |
| 002 | ⋮ | ××× ××× ××× | A5 ↙ COPY SETTINGS | | ⋮ | |
| 003 | ⋮ | ××× ××× ××× | | | ⋮ | |
| 004 | ⋮ | ⋮ | | | ⋮ | |
| 005 | ⋮ | ⋮ | ⋮ | | ⋮ | |
| 006 | ⋮ | ⋮ | ⋮ | | ⋮ | |

OK    CANCEL

FIG. 8

| COMMAND DATA LIST | | | | | |
|---|---|---|---|---|---|
| HISTORY | PENDING | WAITING TO BE PROCESSED | | COMPLETED | ERROR |
| RECORDED TIME | ID | NAME OF COMMAND DATA | | USER ID | INITIATION TIME OF RECEPTION |
| ⋮ | 035 | ⋮ | | ⋮ | ⋮ |
| ⋮ | 036 | ⋮ | | | ⋮ |
| ⋮ | 037 | ⋮ | | | ⋮ |
| ⋮ | 038 | ××× ××× ××× ××× ××× ××× | A6 → PASTE SETTINGS | | ⋮ |
| ⋮ | 039 | ⋮ | | | ⋮ |

OK    CANCEL

FIG. 10

| COMMAND DATA LIST | | | | | | |
|---|---|---|---|---|---|---|
| HISTORY | PENDING | WAITING TO BE PROCESSED | | COMPLETED | ERROR | |
| ID | NAME OF COMMAND DATA | SIZE | INITIATION TIME OF RECEPTION | | TIME OF COMPLETION | |
| 101 | ... | ... | ... | | ... | |
| 102 | ... | ... | ... | | ... | |
| 103 | ... | ... | ... | | ... | |
| 104 | ... | ××× ××× ××× ××× ××× ××× COPY SETTINGS A5 | ... | | ... | |
| 105 | ... | ... | ... | | ... | |
| 106 | ... | ... | ... | | ... | |

OK    CANCEL

FIG. 11

| COMMAND DATA LIST | | | | | |
|---|---|---|---|---|---|
| HISTORY | PENDING | WAITING TO BE PROCESSED | COMPLETED | ERROR | |
| ID | NAME OF COMMAND DATA | SIZE | INITIATION TIME OF RECEPTION | TIME OF COMPLETION | |
| 011 | ⋮ | ⋮ | ⋮ | ⋮ | |
| 012 | ⋮ | ⋮ | ⋮ | ⋮ | |
| 013 | ⋮ | ⋮ | ⋮ | ⋮ | |
| 014 | ⋮ | ⋮ | ⋮ | ⋮ | |

A5 →
×××
×××
×××
×××
×××
COPY SETTINGS

OK   CANCEL

FIG. 12

| COMMAND DATA LIST | | | | | | |
|---|---|---|---|---|---|---|
| HISTORY | PENDING | WAITING TO BE PROCESSED | | COMPLETED | ERROR | |
| ID | NAME OF COMMAND DATA | SIZE | INITIATION TIME OF RECEPTION | | TIME OF COMPLETION | |
| 051 | ... | ... | ××× ××× ×××× ××× ××× COPY SETTINGS (A5) | | ... | |
| 052 | ... | ... | | | ... | |
| 053 | ... | ... | | | ... | |
| 054 | ... | ... | | | ... | |
| 055 | ... | ... | ... | | ... | |
| 056 | ... | ... | | | | |

OK    CANCEL

FIG. 13

| TEMPLATE LIST | | | | | |
|---|---|---|---|---|---|
| ID | NAME OF TEMPLATE | SIZE | INITIATION TIME OF RECEPTION | TIME OF COMPLETION | |
| 01 | ⋮ | · | | ⋮ | |
| 02 | ⋮ | · | A5 ××××× ××××× ××××× ××××× ××××× COPY SETTINGS | ⋮ | |
| 03 | ⋮ | · | | ⋮ | |
| 04 | ⋮ | · | | ⋮ | |
| 05 | ⋮ | · | ⋮ | ⋮ | |
| 06 | ⋮ | · | | | |

OK  CANCEL

| ID | NAME OF COMMAND DATA | SIZE | INITIATION TIME OF RECEPTION | TIME OF COMPLETION |
|---|---|---|---|---|
| 001 | ... | ... | ... | ... |
| 002 | ... | ... | ... | ... |
| 003 | ... | ... | ... | ... |
| 004 | ... | ... | ... | ... |
| 005 | ... | ... | ... | ... |
| 006 | ... | ... | ... | ... |

SETTING PROPERTIES

SIMPLE SETTINGS | SHEET | LAYOUT | COLOR | IMAGE QUALITY

DESIGNATE COPY DESTINATION FOR SETTINGS

OK — A13
CANCEL
START PRINTING
COPY SETTINGS
B13

FIG. 18

| COPY SETTINGS SCREEN | | | | | | B14 |
|---|---|---|---|---|---|---|
| HISTORY | PENDING | WAITING TO BE PROCESSED | COMPLETED | ERROR | | |
| ID | NAME OF COMMAND DATA | SIZE | INITIATION TIME OF RECEPTION | TIME OF COMPLETION | | ◁ ▨▨▨ ▷ |
| 001 | ∙∙∙ | ∙∙∙ | ∙∙∙ | ∙∙∙ | | |
| 002 | ∙∙∙ | ∙∙∙ | ∙∙∙ | ∙∙∙ | | |
| 003 | ∙∙∙ | ∙∙∙ | ∙∙∙ | ∙∙∙ | | |
| 004 | ∙∙∙ | ∙∙∙ | ∙∙∙ | ∙∙∙ | | |
| 005 | ∙∙∙ | ∙∙∙ | ∙∙∙ | ∙∙∙ | | |
| 006 | ∙∙∙ | ∙∙∙ | ∙∙∙ | ∙∙∙ | | |
| SET AS COPY SOURCE — A14 | | SET AS COPY DESTINATION — A15 | | | | CANCEL |

FIG. 20

| COMMAND DATA LIST | | | | | | B16 |
|---|---|---|---|---|---|---|
| HISTORY | PENDING | WAITING TO BE PROCESSED | COMPLETED | ERROR | | |
| ID | NAME OF COMMAND DATA | SIZE | INITIATION TIME OF RECEPTION | TIME OF COMPLETION | ◁ ▒▒▒ ▷ | |
| 001 | ... | ... | ... | ... | | |
| 002 | ... | ... | ... | ... | | |
| 003 | ... | ... | ... | ... | | |
| 004 | ... | ... | ... | ... | | |
| 005 | ... | ... | ... | ... | | |
| 006 | ... | ... | ... | ... | | |

DISPLAY DIFFERENCES — A16

CANCEL

FIG. 25

| COMMAND DATA LIST | | | | | | |
|---|---|---|---|---|---|---|
| HISTORY | PENDING | | WAITING TO BE PROCESSED | COMPLETED | | ERROR |
| RECORDED TIME | ID | NAME OF COMMAND DATA | | USER ID | | INITIATION TIME OF RECEPTION |
| ⋮ | 035 | ⋮ | | ⋮ | | ⋮ |
| ⋮ | 036 | ⋮ | | ⋮ | | ⋮ |
| ⋮ | 037 | ⋮ | | ⋮ | | ⋮ |
| ⋮ | 038 | ⋮ | | ⋮ | | ⋮ |
| ⋮ | 039 | ⋮ | | ⋮ | | ⋮ |

Popup:
XXX
XXX
XXX
XXX
XXX
XXX
PASTE SETTINGS ← A6
DISPLAY DIFFERENCES ← A21

OK    CANCEL

FIG. 26

| SETTING ITEM | COPIABLE/NONCOPIABLE |
|---|---|
| RIP TYPE | COPIABLE |
| SHEET SIZE | NONCOPIABLE |
| OUTPUT PAGE RANGE | NONCOPIABLE |
| . . . | . . . |

IMAGE PROCESSING DEVICE, IMAGE PROCESSING METHOD, AND IMAGE FORMING APPARATUS FOR OVERWRITING A SETTING

CROSS-REFERENCE TO RELATED APPLICATIONS

This application is based on and claims priority under 35 USC 119 from Japanese Patent Application No. 2016-120600 filed Jun. 17, 2016.

BACKGROUND

Technical Field

The present invention relates to image processing devices, image processing methods, and image forming apparatuses.

SUMMARY

According to an aspect of the invention, there is provided an image processing device including a memory and a storage controller. The memory stores a setting of an image forming process in accordance with generation of a first image formation command or an input of a command for generating the first image formation command. The storage controller causes a first setting designated as a result of a first operation to be overwritten and stored over a second setting designated as a result of a second operation and corresponding to a second image formation command. The first setting and the second setting are included in the stored setting.

BRIEF DESCRIPTION OF THE DRAWINGS

Exemplary embodiments of the present invention will be described in detail based on the following figures, wherein:

FIG. 4 illustrates an example of a setting screen;

FIG. 6 illustrates an example of a displayed command-data list;

FIG. 7 illustrates an example of a copy-source designating operation;

FIG. 8 illustrates an example of a copy-destination designating operation;

FIG. 10 illustrates an example of a copy-source designating operation;

FIG. 11 illustrates an example of a copy-source designating operation;

FIG. 12 illustrates an example of a copy-source designating operation;

FIG. 13 illustrates an example of a copy-source designating operation;

FIG. 16 illustrates an example of a copy-source designating operation according to a modification;

FIG. 17 illustrates an example of a copy-source designating operation according to a modification;

FIG. 18 illustrates another example of a copy-source designating operation and a copy-destination designating operation;

FIG. 20 illustrates an example of a difference displaying operation;

FIG. 25 illustrates an example of an operation image for displaying differences;

FIG. 26 illustrates an example of a copiable/noncopiable list; and

DETAILED DESCRIPTION

1. Exemplary Embodiment

Figure 1:
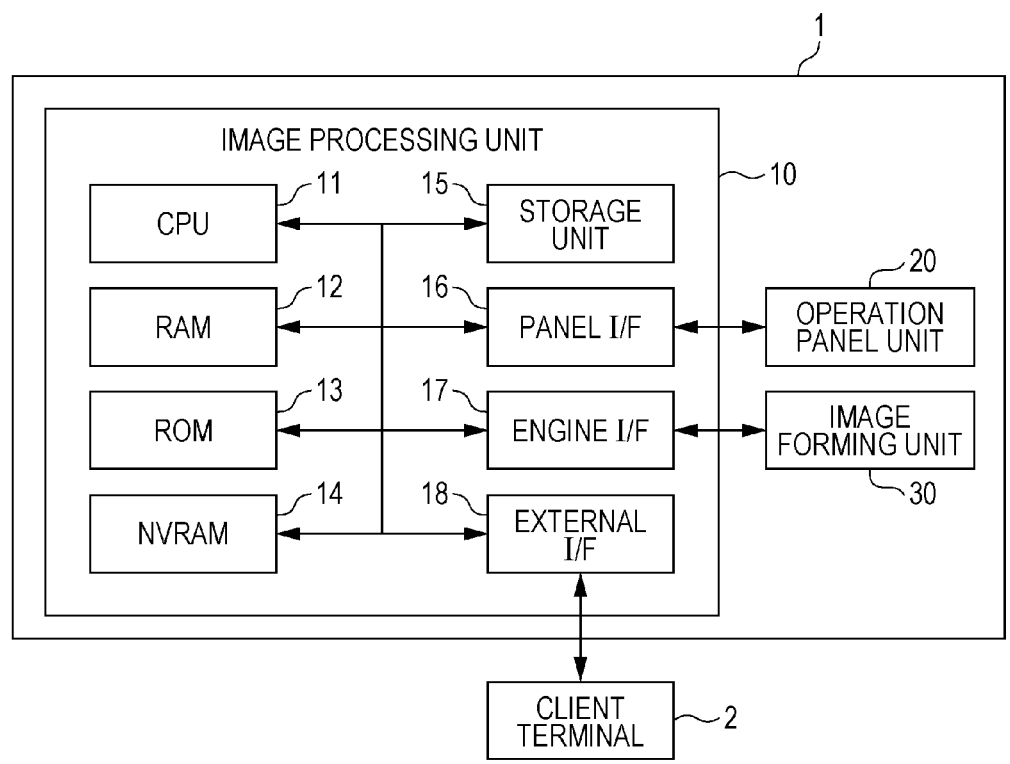
FIG. 1 illustrates a hardware configuration of an image forming apparatus according to an exemplary embodiment.

FIG. 1 illustrates a hardware configuration of an image forming apparatus 1 according to an exemplary embodiment. The image forming apparatus 1 forms an image onto a medium, such as a sheet. FIG. 1 shows a client terminal 2 that receives an operation for commanding the image forming apparatus 1 to form an image. For example, when a user operates the client terminal 2 to designate an image to be formed onto a medium or to set image formation settings (such as sheet, layout, color, and image quality settings), the client terminal 2 transmits command data (also called a job) indicating the contents of the image formation command to the image forming apparatus 1. The image forming apparatus 1 then forms an image in accordance with the command indicated by the received command data.

The image forming apparatus 1 includes an image processing unit 10, an operation panel unit 20, and an image forming unit 30. The image processing unit 10 processes the image indicated by the aforementioned command data so as to convert the image into a format with which the image forming unit 30 is capable of forming the image onto the medium. The operation panel unit 20 includes a display and a touchscreen provided on the surface of the display, and displays the image as well as receiving an operation from the user. Based on the image data converted by the image processing unit 10, the image forming unit 30 forms the image indicated by the image data onto the medium by, for example, electrophotography.

The image processing unit 10 is a computer that includes a central processing unit (CPU) 11, a random access memory (RAM) 12, a read-only memory (ROM) 13, a nonvolatile RAM (NVRAM) 14, a storage unit 15, a panel interface (I/F) 16, an engine I/F 17, and an external I/F 18.

The CPU 11 uses the RAM 12 as a work area to execute a program stored in the ROM 13, the NVRAM 14, or the storage unit 15, thereby controlling the operation of each unit. The NVRAM 14 is a readable-writable memory that stores contents therein even when the apparatus is shut down, and stores data and programs to be used for control by the CPU 11. The storage unit 15 is, for example, a hard disk drive (HDD) or a solid state drive (SSD) and stores data and programs to be used for control by the CPU 11.

The panel I/F 16 is connected to the operation panel unit 20 and relays data exchanged between the operation panel unit 20 and the CPU 11. Examples of such data include image data of an image displayed by the operation panel unit 20 and operation data indicating an operation received by the operation panel unit 20. The engine I/F 17 is connected to the image forming unit 30. When the CPU 11 supplies command data indicating an image formation command for the image forming unit 30, the engine I/F 17 relays the job data and supplies it to the image forming unit 30. The external I/F 18 is connected to the client terminal 2 and relays data exchanged between the client terminal 2 and the CPU 11. For example, the external I/F 18 receives command data transmitted from the client terminal 2 and supplies it to the CPU 11.

Figure 2:
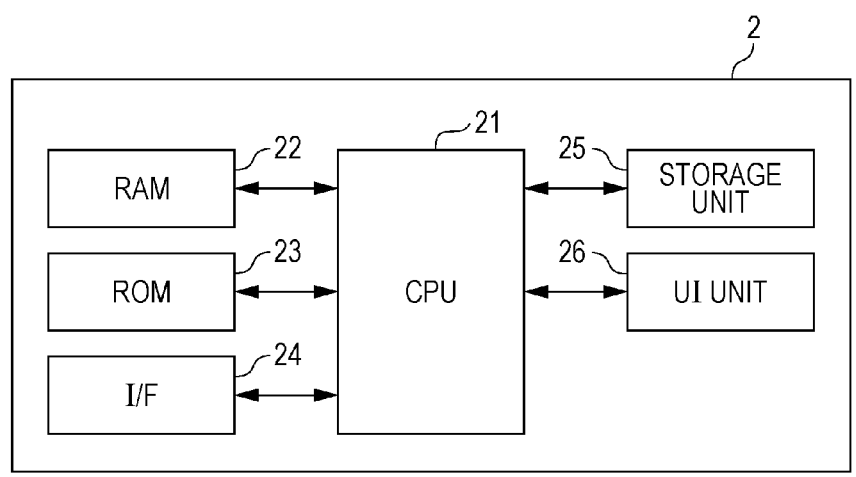
FIG. 2 illustrates a hardware configuration of a client terminal.

FIG. 2 illustrates a hardware configuration of the client terminal 2. The client terminal 2 is a computer that includes a CPU 21, a RAM 22, a ROM 23, an I/F 24, a storage unit 25, and a user interface (UI) unit 26. The CPU 21, the RAM 22, the ROM 23, and the storage unit 25 are hardware devices similar to the hardware devices of the same names shown in FIG. 1. The I/F 24 is connected to the image forming apparatus 1 and relays data exchanged between the image forming apparatus 1 and the CPU 21. The UI unit 26 includes, for example, a display, a keyboard, and a mouse and displays an image and receives an operation from a user.

The CPU 11 included in the image processing unit 10 and the CPU 21 included in the client terminal 2 respectively execute programs to control the respective units, whereby the following functions are realized. In this exemplary embodiment, functions to be realized when the user operates the client terminal 2 will be described.

Figure 3:
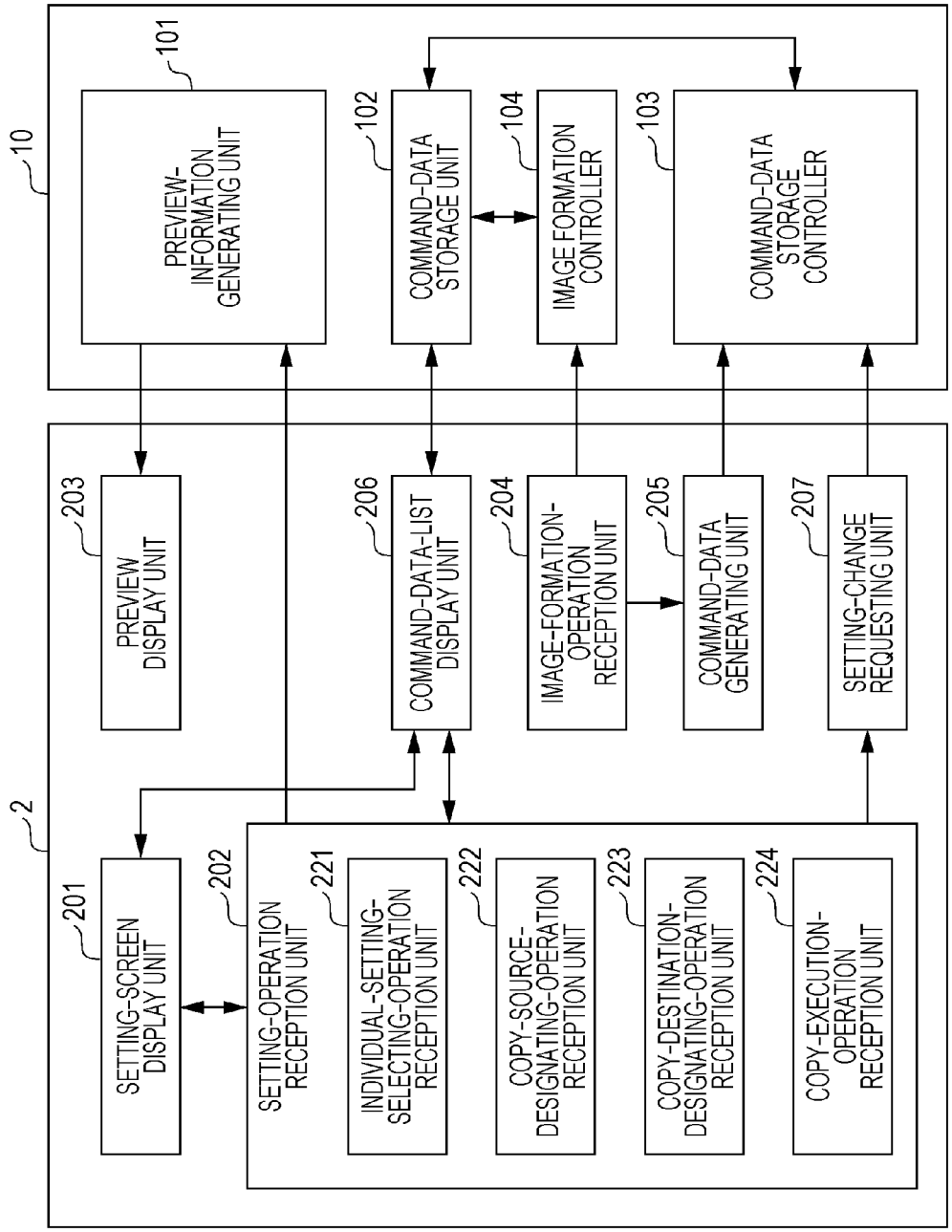
FIG. 3 illustrates a functional configuration realized by an image processing unit and the client terminal.

FIG. 3 illustrates a functional configuration realized by the image processing unit 10 and the client terminal 2. The image processing unit 10 includes a preview-information generating unit 101, a command-data storage unit 102, a command-data storage controller 103, and an image formation controller 104. The client terminal 2 includes a setting-screen display unit 201 that displays a setting screen, a setting-operation reception unit 202 that receives a setting-related operation, a preview display unit 203 that displays a preview, an image-formation-operation reception unit 204 that receives an operation related to image formation, a command-data generating unit 205 that generates command data, a command-data-list display unit 206 that displays a command-data list, and a setting-change requesting unit 207 that makes a request for changing the setting or settings.

When commanding the image forming apparatus 1 to form an image, the setting-screen display unit 201 displays a setting screen for selecting various kinds of settings.

FIG. 4 illustrates an example of the setting screen. In the example in FIG. 4, the setting-screen display unit 201 displays tabs indicating groups of setting items, such as "simple settings", "sheet", "layout", "color", and "image quality" items, setting items for the "simple settings" group from "RIP type" to "sheet tray", "CPSI" and "APPS" settings for the "RIP type" item, a "same as document size" setting and an "expand/reduce" setting for a "sheet size" item, and operation button images (i.e., an OK button A1, a cancel button A2, and a preview button A3). When another tab is selected or the screen is scrolled, the setting-screen display unit 201 displays another setting item and other settings for items.

When the user makes an image formation command, the setting-operation reception unit 202 receives an operation (referred to as "setting operation" hereinafter) for selecting the settings to be used in that image forming process. The setting-operation reception unit 202 includes an individual-setting-selecting-operation reception unit 221 that receives an operation for selecting an individual setting, a copy-source-designating-operation reception unit 222 that receives an operation for designating a copy source, a copy-destination-designating-operation reception unit 223 that receives an operation for designating a copy destination, and a copy-execution-operation reception unit 224 that receives an operation for executing a copying process. The individual-setting-selecting-operation reception unit 221 will be described first.

For example, when the setting screen shown in FIG. 4 is displayed, the individual-setting-selecting-operation reception unit 221 receives an operation for selecting a configurable postscript interpreter (CPSI) as the RIP type or an operation for selecting an Adobe PDF print engine (APPE) as a setting operation. Furthermore, the individual-setting-selecting-operation reception unit 221 receives an operation for pressing the OK button A1 shown in FIG. 4 as a setting operation for confirming the currently-selected settings.

Moreover, the individual-setting-selecting-operation reception unit 221 receives an operation for pressing the cancel button A2 as a setting operation for cancelling the currently-selected settings and restoring the state prior to the displaying of the setting screen. Furthermore, the individual-setting-selecting-operation reception unit 221 receives an operation for pressing the preview button A3 as a setting operation for displaying a printed image, that is, a preview, in a case where the image is formed using the currently-selected settings. When the individual-setting-selecting-operation reception unit 221 receives the setting operation for displaying a preview, the individual-setting-selecting-operation reception unit 221 sends a notification to the image processing unit 10.

When the preview-information generating unit 101 of the image processing unit 10 receives the notification, the preview-information generating unit 101 generates preview information indicating the printed image in a case where the image is formed using the currently-selected settings. The preview-information generating unit 101 transmits the generated preview information to the client terminal 2. When the preview display unit 203 of the client terminal 2 receives the transmitted preview information, the preview display unit 203 displays the printed image, that is, the preview, in the case where the image is formed using the currently-selected settings based on the generated preview information.

Figure 5:
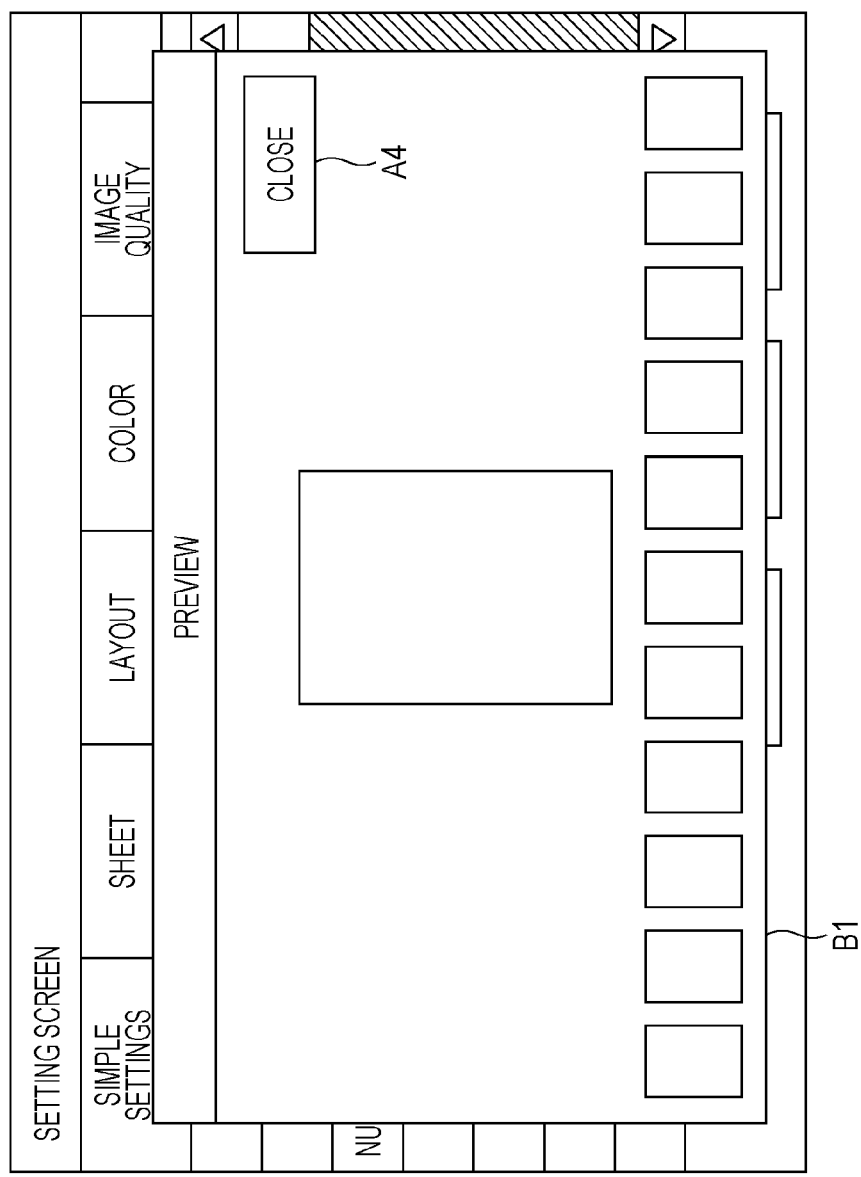
FIG. 5 illustrates an example of a displayed preview.

FIG. 5 illustrates an example of the displayed preview. In the example in FIG. 5, the preview display unit 203 displays a preview B1 including multiple thumbnail images corresponding to the image formation command, a printed image of the selected one of the images, and a close button A4. When the user presses the close button A4, the preview display unit 203 ends the displaying of the preview. When the user views the preview and confirms that an intended image is to be printed, the user performs an operation for starting an image forming process.

The image-formation-operation reception unit 204 receives an operation related to an image forming process. For example, the image-formation-operation reception unit 204 receives a starting operation for starting an image forming process using the currently-selected settings or a stopping operation for stopping the image forming process as an image formation operation. When the image-formation-operation reception unit 204 receives the starting operation, the image-formation-operation reception unit 204 sends a notification to the command-data generating unit 205. When the image-formation-operation reception unit 204 receives the stopping operation, the image-formation-operation reception unit 204 sends a notification to the image forming apparatus 1.

When the starting operation is received by the image-formation-operation reception unit 204, the command-data generating unit 205 generates command data indicating a command for performing an image forming process using the currently-selected settings. The command data contains image information indicating an image to be formed by the image forming unit 30 and setting information indicating the settings to be used in that image forming process. The command-data generating unit 205 transmits the generated command data to the image forming apparatus 1.

The command-data storage unit 102 has a function of storing the image-formation command data and, for example, stores the command data transmitted from the client terminal 2. Thus, when an image formation command (command data) is generated, the command-data storage unit 102 stores the settings for that image forming process. The command-data storage unit 102 corresponds to an example of a "memory" according to an exemplary embodiment of the present invention. The command-data storage unit 102 generates a queue that stores therein command data. The command data stored in this queue is sequentially extracted and is used in the image forming process.

The command-data storage controller 103 controls the information stored in the command-data storage unit 102. The command-data storage controller 103 performs, for example, a writing process for writing command data into the command-data storage unit 102, a setting changing process for changing the settings of the stored command data, a managing process for managing the status of the command data, and a deleting process for deleting the stored command data. The writing process includes a storing process for storing the command data into a queue. The managing process includes a process for storing the status of the command data in association with the command data.

For command data that is stored in a queue in response to an image-formation starting operation and is waiting for its turn in the order used in the image forming process, the command-data storage controller 103 stores the command data in association with a "pending" status. For command data that is waiting to be processed because an image-formation starting operation has not been performed yet or the starting operation has been performed once but has been subsequently stopped, the command-data storage controller 103 stores the command data in association with a "waiting to be processed" status. If the process for forming the image onto the medium has been completed, the command-data storage controller 103 stores the relevant command data in association with a "completed" status. If the process for forming the image onto the medium has failed, the command-data storage controller 103 stores the relevant command data in association with an "error" status. If a predetermined period has elapsed since the completion of the process for forming the image onto the medium, the command-data storage controller 103 stores the relevant command data in association with a "history" status.

The image formation controller 104 controls the image forming process performed by the image forming unit 30. In a case where command data is stored in the "pending" status in the command-data storage unit 102, the image formation controller 104 reads the command data in a predetermined order and commands the image forming unit 30 to form the image in accordance with the command indicated by the read command data. As a result, when the image is formed onto a medium, the command-data storage controller 103 changes the status of the command data from the "pending" status to the "completed" status. When a certain period elapses after changing the status to the "completed" status, the command-data storage controller 103 changes the status of the command data to the "history" status.

If the command-data storage controller 103 is notified by the image-formation-operation reception unit 204 of the client terminal 2 that a stopping operation is received, the command-data storage controller 103 changes the status of the relevant command data stored in the command-data storage unit 102 from the "pending" status to the "waiting to be processed" status. Furthermore, when an image formation command is made but an image is not formed due to an error, the command-data storage controller 103 changes the status of the read command data from the "pending" status to the "error" status.

The command-data-list display unit 206 displays a command-data list stored in the command-data storage unit 102. When an operation for displaying this list is performed by the user, the command-data-list display unit 206 makes a request for command data to the image processing unit 10. When the command-data storage unit 102 receives this request, the command-data storage unit 102 transmits the stored command data and the status thereof to the client terminal 2. The command-data-list display unit 206 displays the command-data list based on the transmitted command data and the status thereof.

FIG. 6 illustrates an example of the displayed command-data list. In the example in FIG. 6, the command-data-list display unit 206 displays tabs indicating the "history", "pending", "waiting", "completed", and "error" statuses and the command-data list corresponding to the "completed" status. For example, if an image is formed on a medium but is not formed in a desired color or layout, the user may sometimes change the settings indicated by the command data and make a command for forming the image again. In that case, for example, the user performs an operation for displaying the command-data list and selecting the command data for which the settings are to be changed.

The individual-setting-selecting-operation reception unit 221 receives this operation as a setting operation and commands the setting-screen display unit 201 to display the setting screen for the settings indicated by the selected command data. In accordance with this command, the setting-screen display unit 201 acquires the selected command data from the command-data-list display unit 206 and displays the setting screen indicating the settings included in the acquired command data. When the user changes the settings on this setting screen and presses the OK button A1 shown in FIG. 4, the individual-setting-selecting-operation reception unit 221 receives this changing operation for changing the settings indicated by the command data as a setting operation and sends a notification to the setting-change requesting unit 207.

When the setting-operation reception unit 202 receives the changing operation, the setting-change requesting unit 207 requests the image processing unit 10 to reflect the change in the currently-selected settings indicated by the command data stored in the command-data storage unit 102. The setting-change requesting unit 207 transmits request data indicating this request to the image processing unit 10.

The command-data storage controller 103 of the image processing unit 10 reflects the change in the settings requested by the setting-change requesting unit 207 onto the relevant command data. When the command-data storage controller 103 receives the request data transmitted from the setting-change requesting unit 207, the command-data storage controller 103 reads the command data indicated by the request data from the command-data storage unit 102, changes the setting information contained in the command data to the setting information indicated by the request data, and overwrites and saves the command data in the command-data storage unit 102. Subsequently, the user designates this command data and performs an image-formation starting operation, so that an image forming process with the changed settings reflected therein is performed.

As an alternative to the above-described method of displaying the setting screen and changing the settings selected and input by the user, the method of changing the settings indicated by the command data includes a method of copying the settings indicated by another command data. In this method, the copy-source-designating-operation reception unit 222 of the client terminal 2 receives a copy-source designating operation for designating the settings serving as a copy source. The settings serving as the copy source correspond to an example of a "first setting" according to an exemplary embodiment of the present invention, and the copy-source designating operation corresponds to an example of a "first operation" according to an exemplary embodiment of the present invention.

The copy-destination-designating-operation reception unit 223 receives a copy-destination designating operation for designating command data serving as a copy destination for the settings designated as a result of the copy-source designating operation. The settings of the command data serving as the copy destination correspond to an example of a "second setting" according to an exemplary embodiment of the present invention, and the copy-destination designating operation corresponds to an example of a "second operation" according to an exemplary embodiment of the present invention.

The copy-execution-operation reception unit 224 receives a copy execution operation for copying the settings designated as a result of the copy-source designating operation onto the command data designated as a result of the copy-destination designating operation. For example, the copy-source designating operation, the copy-destination designating operation, and the copy execution operation are performed on the screen that displays the command-data list shown in FIG. 6.

FIG. 7 illustrates an example of the copy-source designating operation. In the example in FIG. 7, a list of command data in the "completed" status is displayed, and command data with an ID "002" is selected from the command data included in the list. When the user performs a right-click operation in this state, an operation menu is displayed. When a copy-settings button A5 included in the operation menu is pressed, the copy-source-designating-operation reception unit 222 receives this operation as a copy-source designating operation.

Accordingly, in this exemplary embodiment, the copy-source designating operation includes an operation for selecting an image indicating the settings serving as a copy source and for displaying an operation menu and an operation (i.e., pressing of the copy-settings button A5) for selecting an item indicating copying of data onto a clipboard from the operation menu displayed as a result of this operation. Specifically, the operation for selecting an image indicating the settings serving as a copy source and for displaying an operation menu involves performing a right-click operation on this image.

This operation is not limited to a right-click operation and may alternatively be, for example, a double-click operation or a long-press operation if the user interface is a touchscreen. When the copy-source-designating-operation reception unit 222 receives a copy-source designating operation, the copy-source-designating-operation reception unit 222 supplies first specifying information (e.g., ID of command data) for specifying the command data indicating the settings designated as the copy source to the setting-change requesting unit 207.

FIG. 8 illustrates an example of the copy-destination designating operation. In the example in FIG. 8, a list of command data in the "waiting to be processed" status is displayed, and command data with an ID "038" is selected from the command data included in the list. When the user performs a right-click operation in this state, an operation menu is displayed. The copy-destination-designating-operation reception unit 223 receives this operation as a copy-destination designating operation for displaying the operation menu in the state where the command data is selected.

Accordingly, in this exemplary embodiment, the copy-destination designating operation includes an operation (i.e., right-click operation in this example) for selecting an image indicating another image formation command (command data with the ID "038" in the example in FIG. 8) serving as a copy destination and for displaying an operation menu. When a paste-settings button A6 included in the displayed operation menu is pressed, the copy-execution-operation reception unit 224 receives this operation as a copy execution operation and sends a notification to the setting-screen display unit 201. When the setting-screen display unit 201 is notified that the paste-settings button A6 has been pressed, the setting-screen display unit 201 displays a warning image for warning that the settings will be overwritten.

Figure 9:
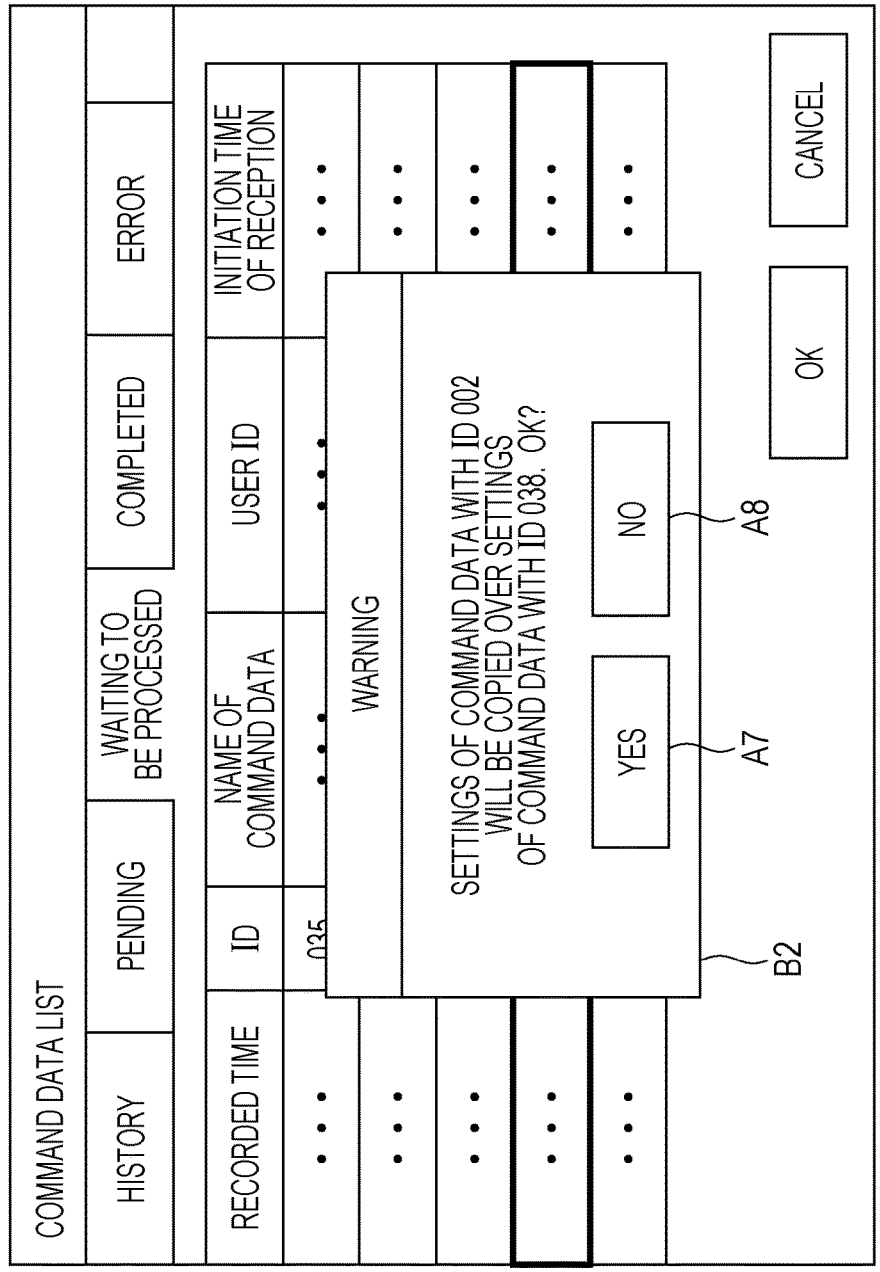
FIG. 9 illustrates an example of a displayed warning image.

FIG. 9 illustrates an example of the displayed warning image. In the example in FIG. 9, the setting-screen display unit 201 displays a warning image B2 that includes a character string "settings of command data with ID 002 will be copied over settings of command data with ID 038. OK?". Moreover, the setting-screen display unit 201 displays a "yes" button A7 and a "no" button A8. If the user presses the "no" button A8 in this state, the copying of the settings is not performed, and the setting screen returns to the displaying of the command-data list. If the user presses the "yes" button A7 in this state, the copy-execution-operation reception unit 224 receives this operation as a copy execution operation.

Accordingly, in this exemplary embodiment, the copy execution operation includes an operation (i.e., pressing of the paste-settings button A6) for selecting an item indicating pasting of data copied on the clipboard from an operation menu displayed as a result of the copy-destination designating operation and an operation (i.e., pressing of the "yes" button A7) for approving overwriting of the settings. When the copy-execution-operation reception unit 224 receives a copy execution operation, the copy-destination-designating-operation reception unit 223 supplies second specifying information (e.g., ID of command data) for specifying the command data designated as the copy destination to the setting-change requesting unit 207.

The setting-change requesting unit 207 transmits, to the image processing unit 10, request data for changing the settings indicated by the command data specified by the second specifying information supplied from the copy-destination-designating-operation reception unit 223 to the settings indicated by the command data specified by the first specifying information supplied from the copy-source-designating-operation reception unit 222. When the command-data storage controller 103 receives this request data, the command-data storage controller 103 reads the two pieces of command data indicated by the request data, changes the settings of the command data designated as the copy destination to the settings of the command data designated as the copy source, and causes the command-data storage unit 102 to store the settings.

Accordingly, when the above-described copy execution operation is performed, the command-data storage controller 103 causes the first settings included in the settings stored in the command-data storage unit 102 and designated as a result of the copy-source designating operation to be overwritten and stored over the settings of another command data designated as a result of the copy-destination designating operation. The command-data storage controller 103 corresponds to an example of "storage controller" according to an exemplary embodiment of the present invention.

More specifically, when an operation (i.e., pressing of the paste-settings button A6 shown in FIG. 8) for selecting an item indicating pasting of data copied on the clipboard from the operation menu displayed as a result of the copy-destination designating operation is performed, the command-data storage controller 103 reads the settings of the copy source from the clipboard and causes the settings of the copy source to be overwritten and stored over the settings indicated by the command data serving as the copy destination.

Although the settings of the command data in the "completed" status, that is, the settings with respect to a command executed in the past, are designated as the settings of the copy source (i.e., an example of the first settings) as a result of the copy-source designating operation in the example in FIG. 7, for example, the settings with respect to a command in the pending status or the settings with respect to a command in the stand-by status may alternatively be designated as the settings of the copy source.

FIGS. 10, 11, and 12 illustrate examples of the copy-source designating operation. In the example in FIG. 10, the settings with respect to command data in the "history" status are designated as the settings of the copy source as a result of a copy-source designating operation performed by pressing the copy-settings button A5. In the example in FIG. 11, the settings with respect to command data in the "pending" status are designated as the settings of the copy source as a result of a copy-source designating operation performed by pressing the copy-settings button A5. In the example in FIG. 12, the settings with respect to command data in the "waiting to be processed" status are designated as the settings of the copy source as a result of a copy-source designating operation performed by pressing the copy-settings button A5.

Furthermore, if the image processing unit 10 stores templates each indicating a command having preset settings registered therein, the settings with respect to a command stored as one of the templates may be designated as the settings of the copy source.

FIG. 13 illustrates an example of the copy-source designating operation. In the example in FIG. 13, a copy-source designating operation is performed by pressing the copy-settings button A5 in a state where a template with an ID "01" is selected from templates displayed on a template-list screen, and the settings in the selected template are designated as the settings of the copy source.

Based on the above-described configuration, the image forming apparatus 1 and the client terminal 2 perform an image forming process for forming an image onto a medium and a copying process for copying the image formation settings.

Figure 14:
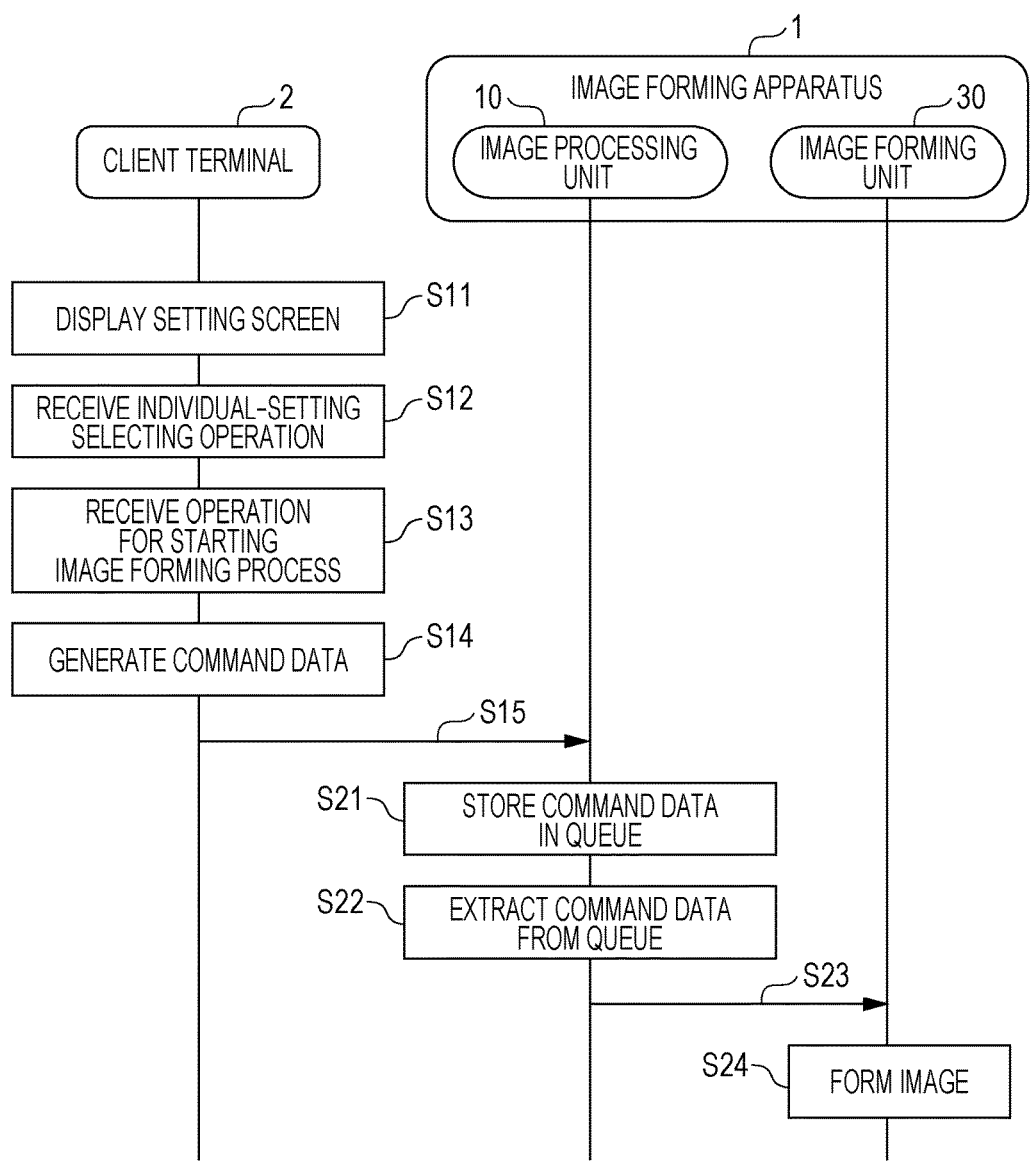
FIG. 14 illustrates an example of an operational procedure of devices in an image forming process.

FIG. 14 illustrates an example of an operational procedure of the devices in the image forming process. For example, this operational procedure commences when the user performs an operation for displaying the setting screen. First, in step S11, the client terminal 2 (i.e., the setting-screen display unit 201) displays the setting screen.

Then, in step S12, the client terminal 2 (i.e., the individual-setting-selecting-operation reception unit 221) receives an operation for individually selecting the settings of the respective items. Subsequently, in step S13, the client terminal 2 (i.e., the image-formation-operation reception unit 204) receives an operation for starting an image forming process. Then, the client terminal 2 (i.e., the command-data generating unit 205) generates command data in step S14 and transmits the generated command data to the image forming apparatus 1 in step S15.

When the image processing unit 10 (i.e., the command-data storage unit 102 and the command-data storage controller 103) receives the command data in step S15, the image processing unit 10 (i.e., the command-data storage unit 102 and the command-data storage controller 103) stores the received command data into a queue in step S21. Then, the image processing unit 10 (i.e., the image formation controller 104) extracts the command data from the queue in step S22 and commands the image forming unit 30 to perform an image forming process based on the command indicated by the extracted command data in step S23. In step S24, the image forming unit 30 forms an image onto a medium based on the command received in step S23.

Figure 15:
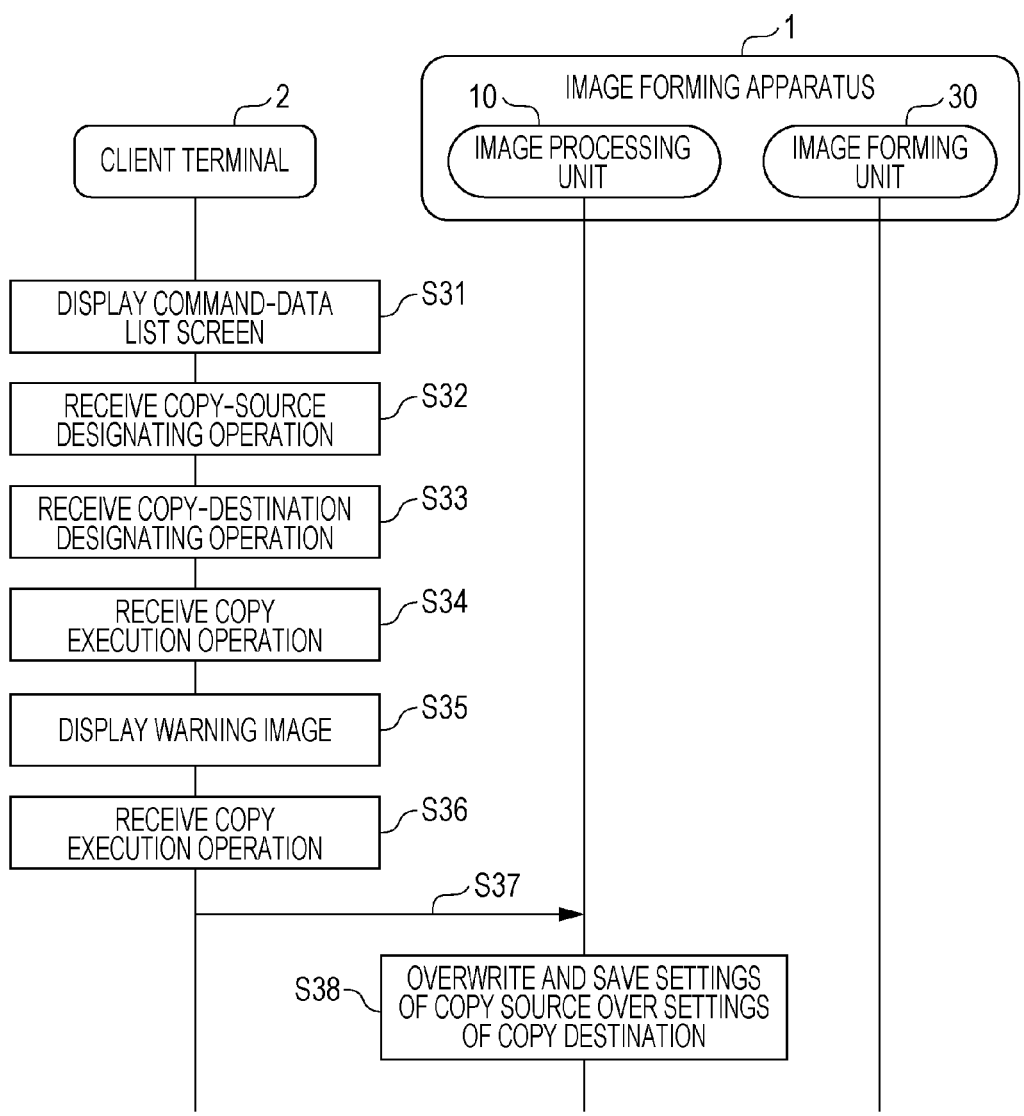
FIG. 15 illustrates an example of an operational procedure of devices in a copying process.

FIG. 15 illustrates an example of an operational procedure of the devices in the copying process. For example, this operational procedure commences when the user performs an operation for displaying the command-data list screen. First, in step S31, the client terminal 2 displays the command-data list screen. Then, in step S32, the client terminal 2 (i.e., the copy-source-designating-operation reception unit 222) receives, for example, an operation for right-clicking on the command data indicating the settings of the copy source and an operation for pressing the copy-settings button A5 in FIG. 7 as a copy-source designating operation. Subsequently, in step S33, the client terminal 2 (i.e., the copy-destination-designating-operation reception unit 223) receives, for example, an operation for right-clicking on the command data serving as a copy destination as a copy-destination designating operation.

In step S34, the client terminal 2 (i.e., the copy-execution-operation reception unit 224) receives an operation for pressing the paste-settings button A6 as a copy execution operation. Then, in step S35, the client terminal 2 displays, for example, the warning image shown in FIG. 9. In step S36, the client terminal 2 (i.e., the copy-execution-operation reception unit 224) receives, for example, an operation for pressing the "yes" button A7 included in the warning image as a copy execution operation. Then, in step S37, the client terminal 2 (i.e., the setting-change requesting unit 207) requests the image processing unit 10 to overwrite the settings of the copy source over the settings of the copy destination. In step S38, the image processing unit 10 (i.e., the command-data storage unit 102 and the command-data storage controller 103) executes the requested overwriting process so as to overwrite and store the settings of the designated copy source over the settings of the designated copy destination.

In order to utilize the settings of first command data in second command data, for example, there is a method of utilizing a template, as described with reference to FIG. 13. For example, in a case where the image processing unit 10 has a function of extracting the settings of certain command data as a template and a function of applying the settings of the template to certain command data, the user first performs an operation for selecting first command data and then performs an operation for extracting the settings of the selected first command data as a template. Then, the user performs an operation for displaying the template list as shown in FIG. 13, an operation for selecting a template generated in the above-described operation, and an operation for applying the settings of the template to second command data.

However, in addition to performing the operation for designating the first settings and the operation for designating the second command data, this method is troublesome in that it involves performing the operation for selecting the template from which the first settings are extracted (i.e., the operation for displaying the template list and the operation for selecting a relevant template from the list). In this exemplary embodiment, when copying the settings, only the operation for designating the first settings and the operation for designating the second command data are performed so that the settings used in the image formation command are simply utilized, as compared with the case where the settings are made into a template.

Furthermore, in this exemplary embodiment, the same operation as a text copy-and-paste operation is used as the operation for designating the first settings and the operation for designating the second command data. Therefore, the settings used in the image formation command are utilized in accordance with the copy-and-paste operation. Moreover, in this exemplary embodiment, the settings of command data in the completed, history, pending, and waiting-to-be-processed statuses are utilized, as described above with reference to FIGS. 7, 10, 11, and 12.

Furthermore, in this exemplary embodiment, the settings indicated by a template are designated as the first settings so that the settings of the template are also utilized, as described above with reference to FIG. 13.

2. Modifications

The above-described exemplary embodiment is merely an example of an exemplary embodiment of the present invention and may be modified as follows. Furthermore, the exemplary embodiment and modifications may be combined, where appropriate.

2.1. Copy-Source Designating Operation and Copy-Destination Designating Operation The copy-source designating operation and the copy-destination designating operation are not limited to the copy-and-paste operation described in the exemplary embodiment.

Figure 16:
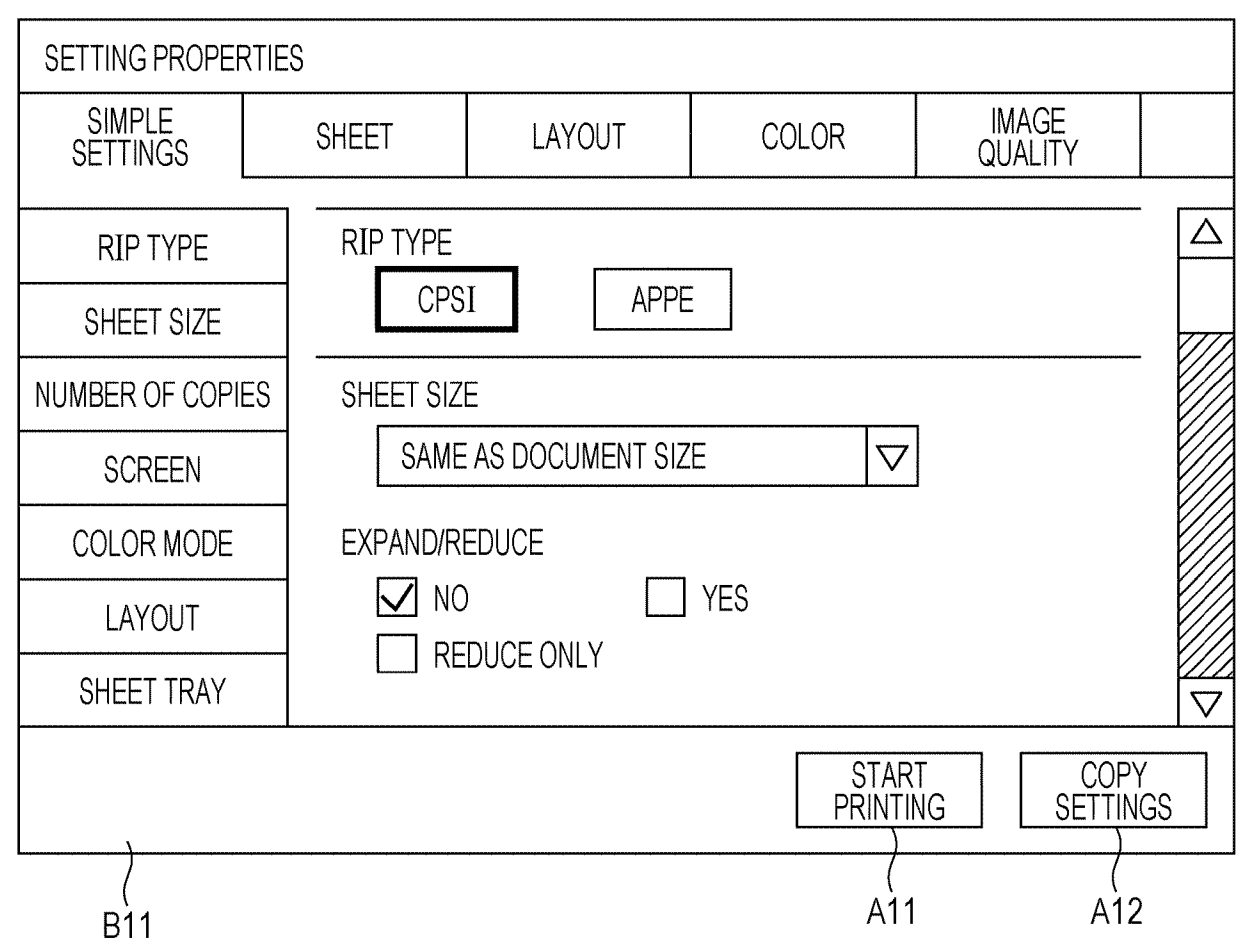

FIG. 16 illustrates an example of the copy-source designating operation according to this modification. In the example in FIG. 16, a property screen B11 indicating the settings of command data in the "completed" or "history" status is displayed.

In the property screen B11, a start-printing button A11 and a copy-settings button A12 are displayed. When the start-printing button A11 is pressed, the image-formation-operation reception unit 204 receives this operation as an operation for starting an image forming process, and an image is formed using the displayed settings. When the copy-settings button A12 is pressed, the copy-source-designating-operation reception unit 222 receives this operation as a copy-source designating operation.

FIG. 17 illustrates an example of the copy-source designating operation according to this modification. In the example in FIG. 17, a selection image B13 that allows selection of a copy destination for the settings is displayed over the property screen shown in FIG. 16. The selection image B13 includes, for example, a list of command data in the "completed" or "history" status and an OK button A13. When the user selects any of the command data from the command-data list, the copy-destination-designating-operation reception unit 223 receives this operation as a copy-destination designating operation. Furthermore, when the user presses the OK button A13, the copy-execution-operation reception unit 224 receives this operation as a copy execution operation. Subsequently, an image warning that the settings will be overwritten, like the warning image B2 shown in FIG. 9, is displayed. When the "yes" button A7 is pressed in this state, the settings are overwritten.

In addition to the above example, for example, the first operation may be an operation for selecting an image indicating the first settings (i.e., the settings of the copy source), and the second operation may be an operation for selecting an image indicating command data indicating the second settings (i.e., a copy-destination command).

FIG. 18 illustrates another example of the copy-source designating operation and the copy-destination designating operation. In the example in FIG. 18, a copy-settings screen B14 for copying the settings is displayed. The copy-settings screen B14 includes a list of command data identical to the above command-data list, a set-as-copy-source button A14, and a set-as-copy-destination button A15.

In this example, when the user selects any of the command data from the command-data list and presses the set-as-copy-source button A14, the copy-source-designating-operation reception unit 222 receives this operation as a copy-source designating operation. Furthermore, when the user selects any of the command data from the command-data list and presses the set-as-copy-destination button A15, the copy-destination-designating-operation reception unit 223 receives this operation as a copy-destination designating operation.

Furthermore, in this example, the operation for pressing the set-as-copy-source button A14 and the operation for pressing the set-as-copy-destination button A15 may be performed in a freely-chosen order, and the copy-execution-operation reception unit 224 receives the subsequently-performed operation as a copy execution operation. Accordingly, the copy-source designating operation and the copy-destination designating operation may be performed in a freely-chosen order, and one of the copy-source designating operation and the copy-destination designating operation and the copy execution operation may be a shared operation.

2.2. Displaying of Differences

The determination of whether or not the settings are to be copied may be performed after comparing the differences between two settings.

Figure 19:
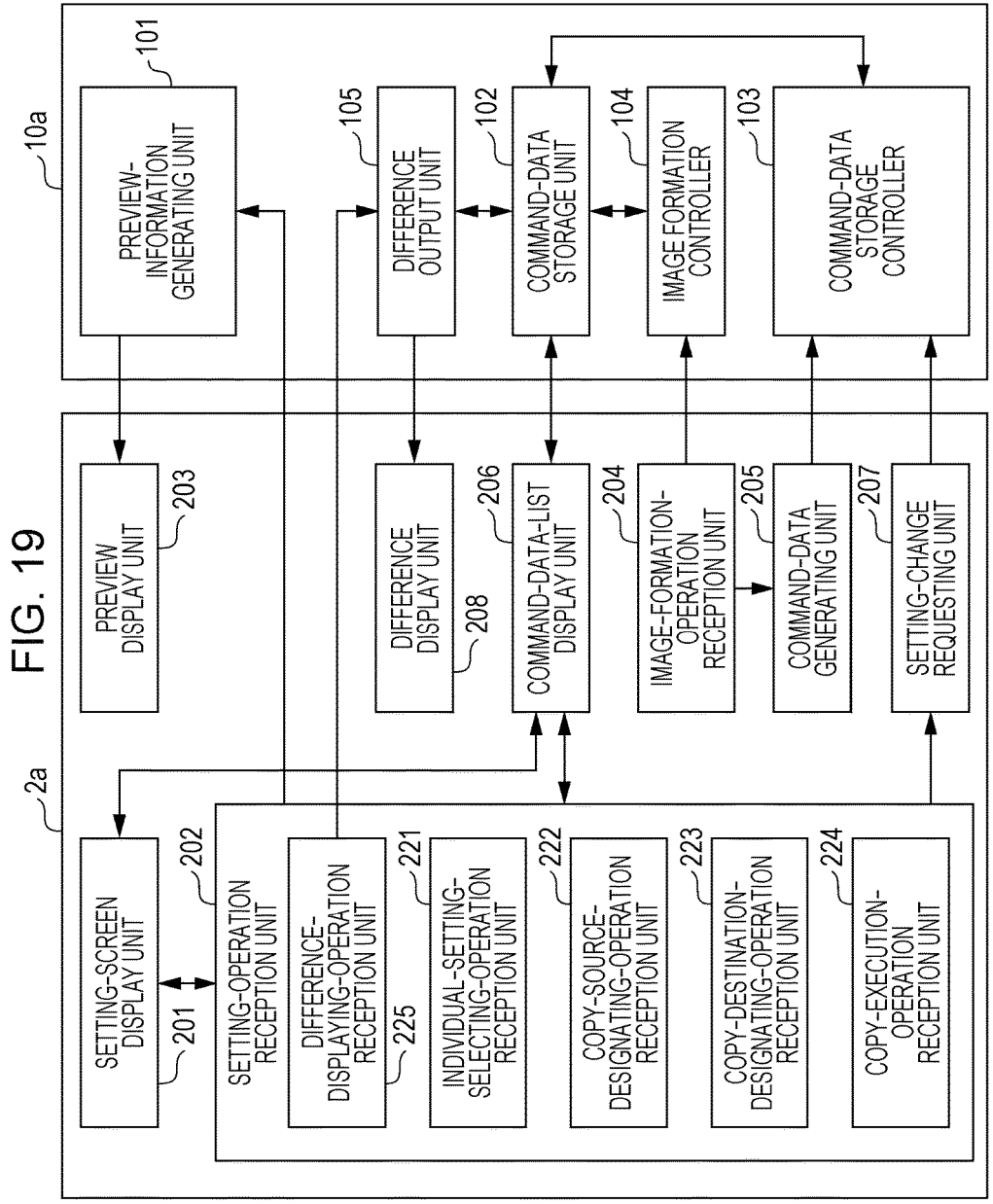
FIG. 19 illustrates an example of a functional configuration according to a modification.

FIG. 19 illustrates an example of a functional configuration according to this modification. In the example in FIG. 19, a client terminal 2*a*, which includes a difference-displaying-operation reception unit 225 and a difference display unit 208 in addition to the units shown in FIG. 3, and an image processing unit 10*a*, which includes a difference output unit 105 in addition to the units shown in FIG. 3, are illustrated.

The difference-displaying-operation reception unit 225 receives a difference displaying operation for displaying the differences between two settings. The differences in this case are reference information to be used when determining whether or not the settings are to be copied, and the difference displaying operation is one of setting operations. Therefore, the difference-displaying-operation reception unit 225 is a function included in the setting-operation reception unit 202. The difference-displaying-operation reception unit 225 receives an operation for designating the two settings as the difference displaying operation. The difference-displaying-operation reception unit 225 transmits, to the image processing unit 10a, specifying information (e.g., ID of command data) for specifying the two settings designated as a result of the received operation.

The difference output unit 105 outputs the differences between the two settings designated as a result of the operation received by the difference-displaying-operation reception unit 225. When the difference output unit 105 receives the specifying information transmitted from the difference-displaying-operation reception unit 225, the difference output unit 105 reads, from the command-data storage unit 102, command data indicating the two settings specified by the specifying information. Of the settings indicated by the two read pieces of command data, the difference output unit 105 extracts settings that are different from each other and generates difference data indicating the extracted settings. The difference output unit 105 outputs the generated difference data to the client terminal 2a.

The difference display unit 208 displays the differences between the two settings output from the difference output unit 105. The following description with reference to FIGS. 20 to 22 relates to screen transition until the differences between the two settings are displayed.

FIG. 20 illustrates an example of the difference displaying operation. In the example in FIG. 20, a command-data-list screen B16 displays a list of command data in the "completed" status and a display-differences button A16, and command data with an ID "003" is selected.

Figure 21:
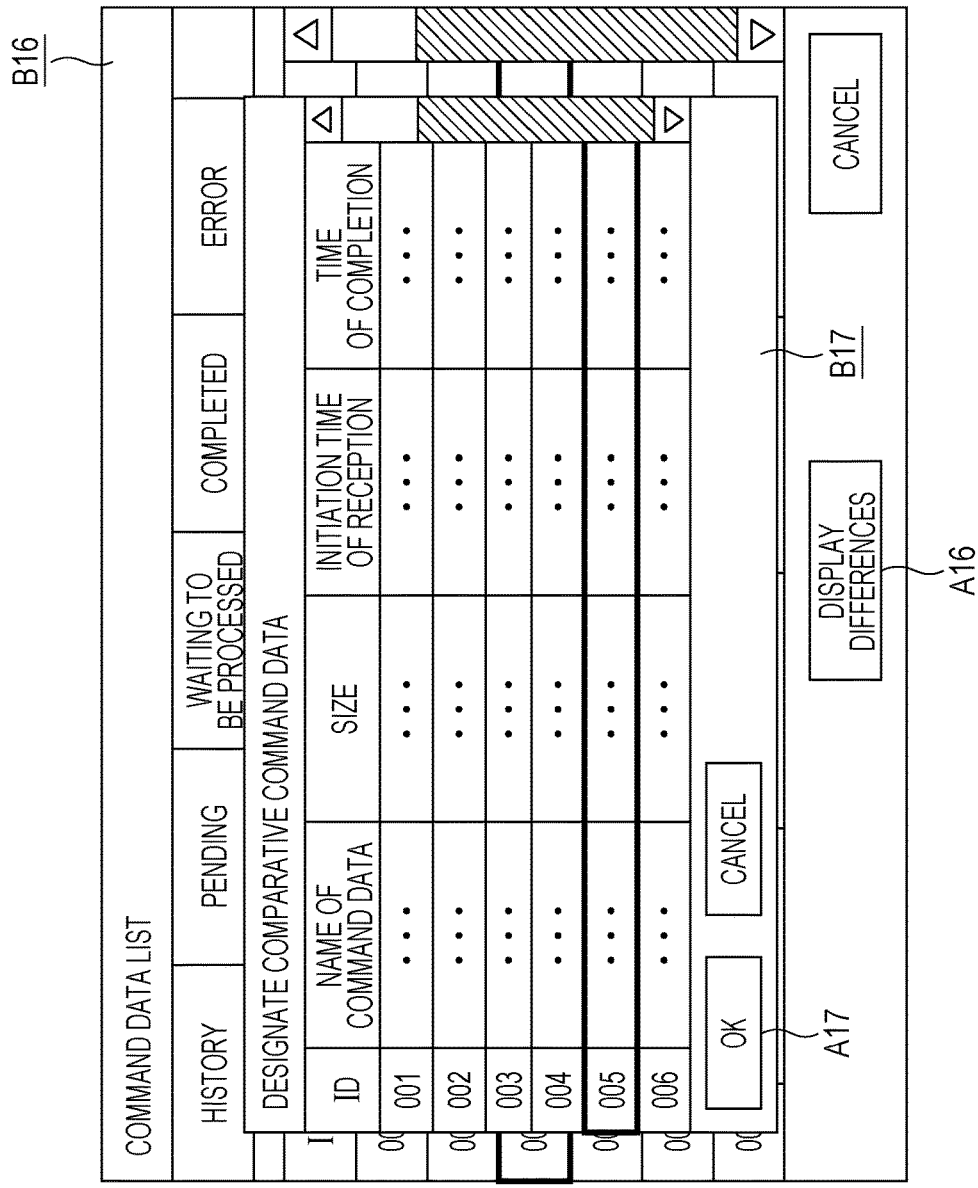
FIG. 21 illustrates an example of a difference displaying operation.

FIG. 21 illustrates an example of the difference displaying operation. In the example in FIG. 21, a command-data-list screen B17 for designating comparative command data is displayed over the command-data-list screen B16 shown in FIG. 20, and command data with an ID "005" is selected. The command-data-list screen B17 includes an OK button A17. When the user presses the display-differences button A16 in the state in FIG. 20, the setting-screen display unit 201 displays the command-data-list screen B17. When the user presses the OK button A17 in the state in FIG. 21, the difference-displaying-operation reception unit 225 receives the previous operations (i.e., the operation for selecting each piece of command data, the operation for pressing the display-differences button A16, and the operation for pressing the OK button A17) as difference displaying operations.

Figure 22:
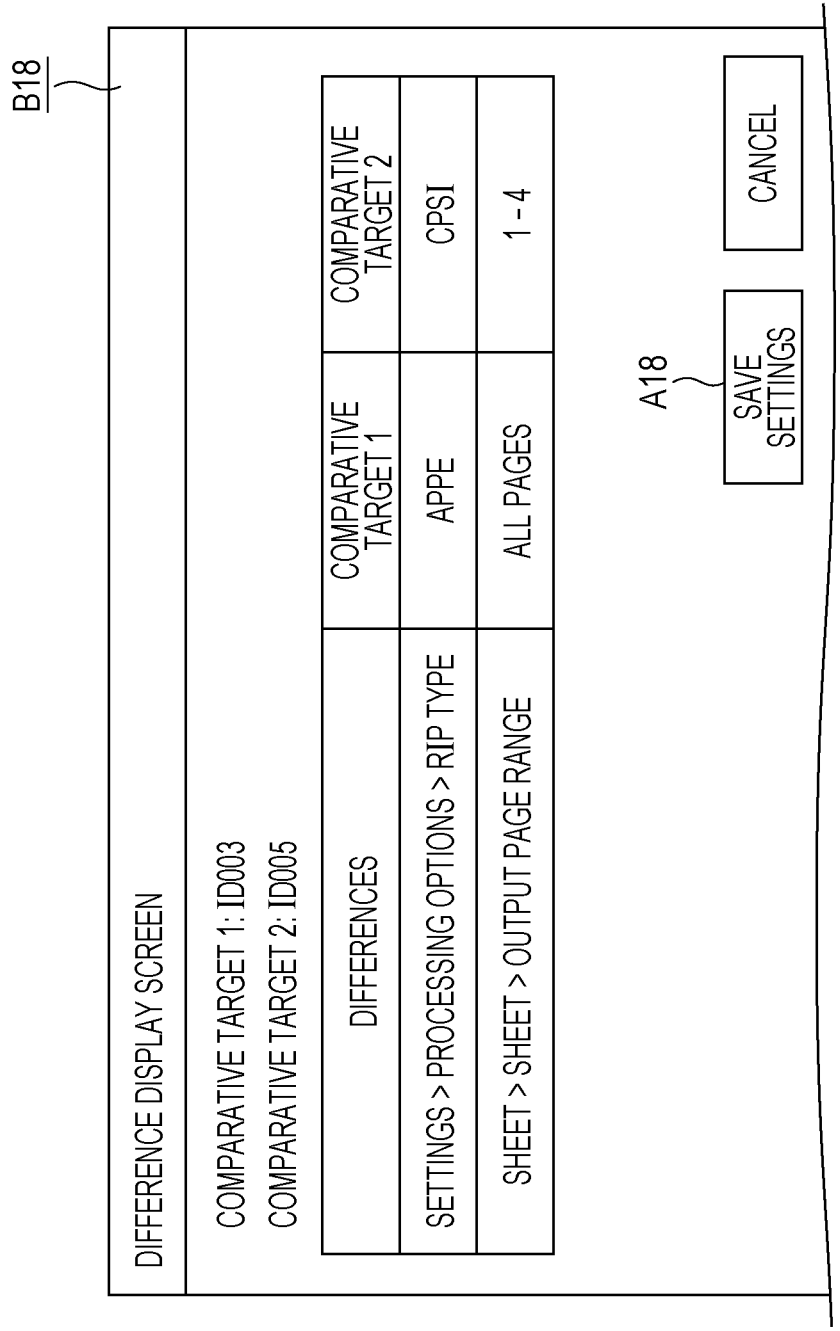
FIG. 22 illustrates an example of displayed differences.

FIG. 22 illustrates an example of the displayed differences. In the example in FIG. 22, the difference display unit 208 displays a difference display screen B18 indicating the differences between the settings of command data with "ID 003" as a comparative target 1 and the settings of command data with "ID005" as a comparative target 2. In this example, a difference 1 in which the "RIP type" is "APPS" for the comparative target 1 and "CPSI" for the comparative target 2 and a difference 2 in which the "output page range" is "all pages" for the comparative target 1 and "1-4" for the comparative target 2 are displayed. The differences are output and displayed in this manner so that the user may readily determine whether or not the settings are to be copied, as compared with a case where the two settings are entirely compared.

The difference display screen B18 displays a save-settings button A18. Furthermore, when the user selects one of the difference 1 and the difference 2 and performs a right-click operation, a copy-operation image for copying the settings is displayed.

Figure 23:
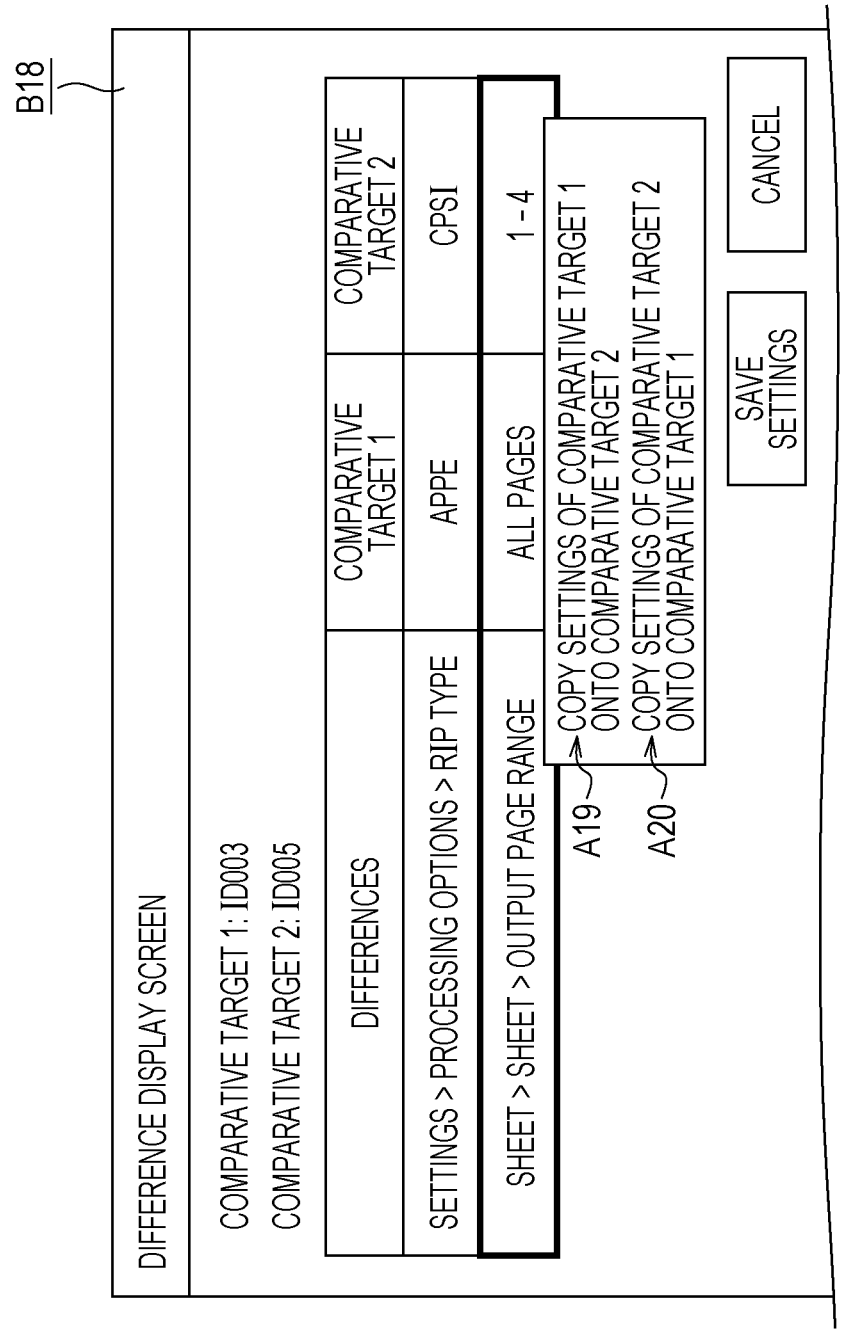
FIG. 23 illustrates an example of a displayed copy-operation image.

FIG. 23 illustrates an example of the displayed copy-operation image. In the example in FIG. 23, a copy-operation image A19 indicating a character string "copy settings of comparative target 1 onto comparative target 2" and a copy-operation image A20 indicating a character string "copy settings of comparative target 2 onto comparative target 1" are displayed in a state where the difference 2 with respect to the "output page range" is selected.

When the user presses the copy-operation image A19 or the copy-operation image A20, the copy-source-designating-operation reception unit 222 and the copy-destination-designating-operation reception unit 223 receive this operation as a copy-source designating operation and a copy-destination designating operation. For example, when an operation for pressing the copy-operation image A20 is received in the state where the "output page range" in the example in FIG. 23 is selected, the copy-source-designating-operation reception unit 222 receives this operation as a copy-source designating operation for designating the comparative target 2 as the settings of the copy source, and the copy-destination-designating-operation reception unit 223 receives this operation as a copy-destination designating operation for designating the comparative target 1 as the settings of the copy destination. Then, the settings in the case where copying is performed with the copy source and the copy destination designated in this manner are displayed on the difference display screen B18.

Figure 24:
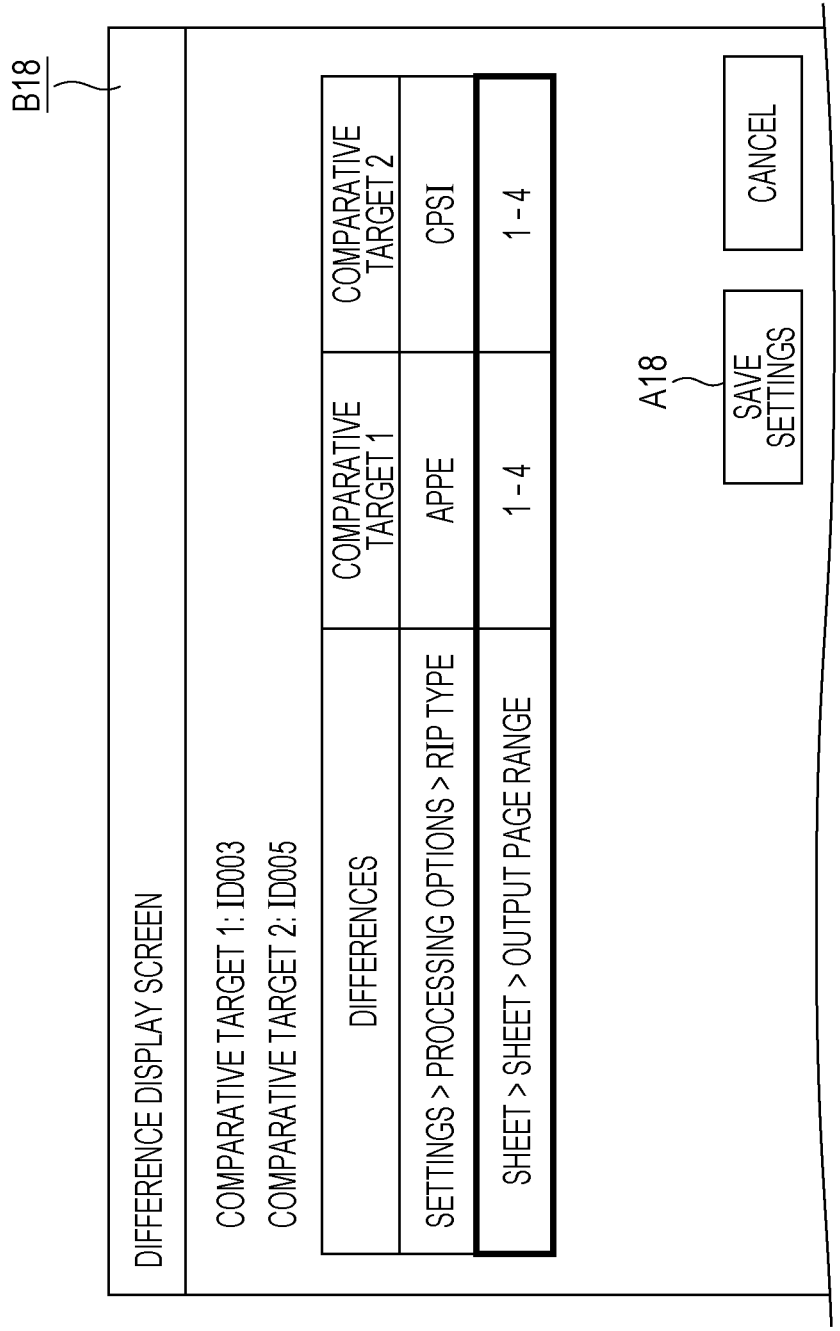
FIG. 24 illustrates an example of settings in a case where copying is performed.

FIG. 24 illustrates an example of the settings in a case where copying is performed. In the example in FIG. 24, the "output page range" of the comparative target 1 is displayed after being changed to the setting of "1-4" of the comparative target 2. When the save-settings button A18 is pressed in this state, the copy-execution-operation reception unit 224 receives this operation as a copy execution operation, and the command-data storage controller 103 overwrites and saves the settings.

Accordingly, in this modification, an operation for designating the settings of the copy source indicating the differences output from the difference output unit 105 is performed as a copy-source designating operation. Furthermore, when an operation for designating the settings of the copy destination indicating the output differences is performed, the command data serving as the copy destination is designated so that this operation is performed as a copy-destination designating operation. Accordingly, the time and effort spent from when the differences between the two settings are compared to when the settings are copied may be reduced, as compared with a case where the settings of the copy source and the settings of the copy destination indicating the output differences are not designated.

2.3. Method of Displaying Differences

The method of displaying the differences described in the above modification is not limited to that described above. For example, when the user designates the settings of the copy source and designates the command data serving as the copy destination, an operation image for displaying the differences may be displayed.

FIG. 25 illustrates an example of the operation image for displaying the differences. In the example in FIG. 25, an operation menu is displayed as a result of a right-click operation for designating command data serving as the copy destination in the command-data list shown in FIG. 8. In addition to the paste-settings button A6, this operation menu displays a display-differences button A21 as an operation image for displaying the differences. When the user presses the display-differences button A21, the difference output unit 105 outputs the differences between the settings of the command data serving as the copy source and the settings of the command data serving as the copy destination so that, for example, the difference display screen shown in the example in FIG. 22 is displayed.

Alternatively, without displaying the display-differences button A21, the difference output unit 105 may always output the differences between the settings when the settings of the copy source and the command data serving as the copy destination are designated, and the difference display unit 208 may display the output differences. As another alternative, the difference output unit 105 does not necessarily have to output the differences even if there are differences between the settings. For example, in a case where there are differences between the settings, the respective units may operate in a first mode in which the command-data storage controller 103 causes the settings of the copy source to be overwritten and stored over the settings of the command data serving as the copy destination without the difference output unit 105 outputting the differences.

In that case, if there are differences between the settings, the respective units may also operate in a second mode in which the command-data storage controller 103 causes the settings of the copy source to be overwritten and stored over the settings of the command data serving as the copy destination after an operation for authorizing overwriting of the differences output from the difference output unit 105 is performed. The user may then select between the first mode and the second mode. The overwriting authorization operation is, for example, pressing of the save-settings button A18 shown in FIG. 24 (i.e., saving the copied settings naturally implies that overwriting is authorized).

As a further alternative, the warning image B2 shown in FIG. 9 may be displayed, and pressing of the "yes" button A7 may be set as the overwriting authorization operation. By causing the respective units to operate in the first and second modes in this manner, the user may select an operational mode in accordance with the conditions desired for copying the settings, such as selecting the first mode if the user desires to perform the setting process quickly or selecting the second mode if the user only desires necessary copying processes to be performed while checking the contents of the settings to be copied.

2.4. Copiable/Noncopiable Setting for Each Setting Item

Although the settings of the copy source include the settings of multiple items, a copiable/noncopiable setting may be set for each item. In that case, the command-data storage controller 103 does not allow the setting of a specific item among the multiple items to be overwritten and stored. In contrast, the command-data storage controller 103 causes the setting of an item other than the specific item to be overwritten and stored. For example, the command-data storage controller 103 performs this storage control by using a copiable/noncopiable list indicating a copiable item and a noncopiable item. In this case, the term "item" includes a single item or multiple items, and the term "setting" includes a single setting or multiple settings.

FIG. 26 illustrates an example of the copiable/noncopiable list. The copiable/noncopiable list shown in FIG. 26 indicates that the setting item of "RIP type" is copiable and that the setting items of "sheet size" and "output page range" are noncopiable. This is an example in which the "sheet size" and "output page range" setting items are specific items that are not to be overwritten and saved. For example, in a case where the settings of command data for commanding formation of 100 pages of images are the copy source and command data for commanding formation of 10 pages of images is the copy destination, if the output page range is to be copied, the output page range of the copy destination becomes 11 pages or more, which exceeds the number of pages of images, possibly causing an error. In this modification, the setting or settings of a specific item or items is/are not copied in this manner so that an error caused by mismatched settings may be prevented.

2.5. Devices that Realize Functions

The functions illustrated in, for example, FIG. 3 may be realized by devices different from those in the exemplary embodiment.

Figure 27:
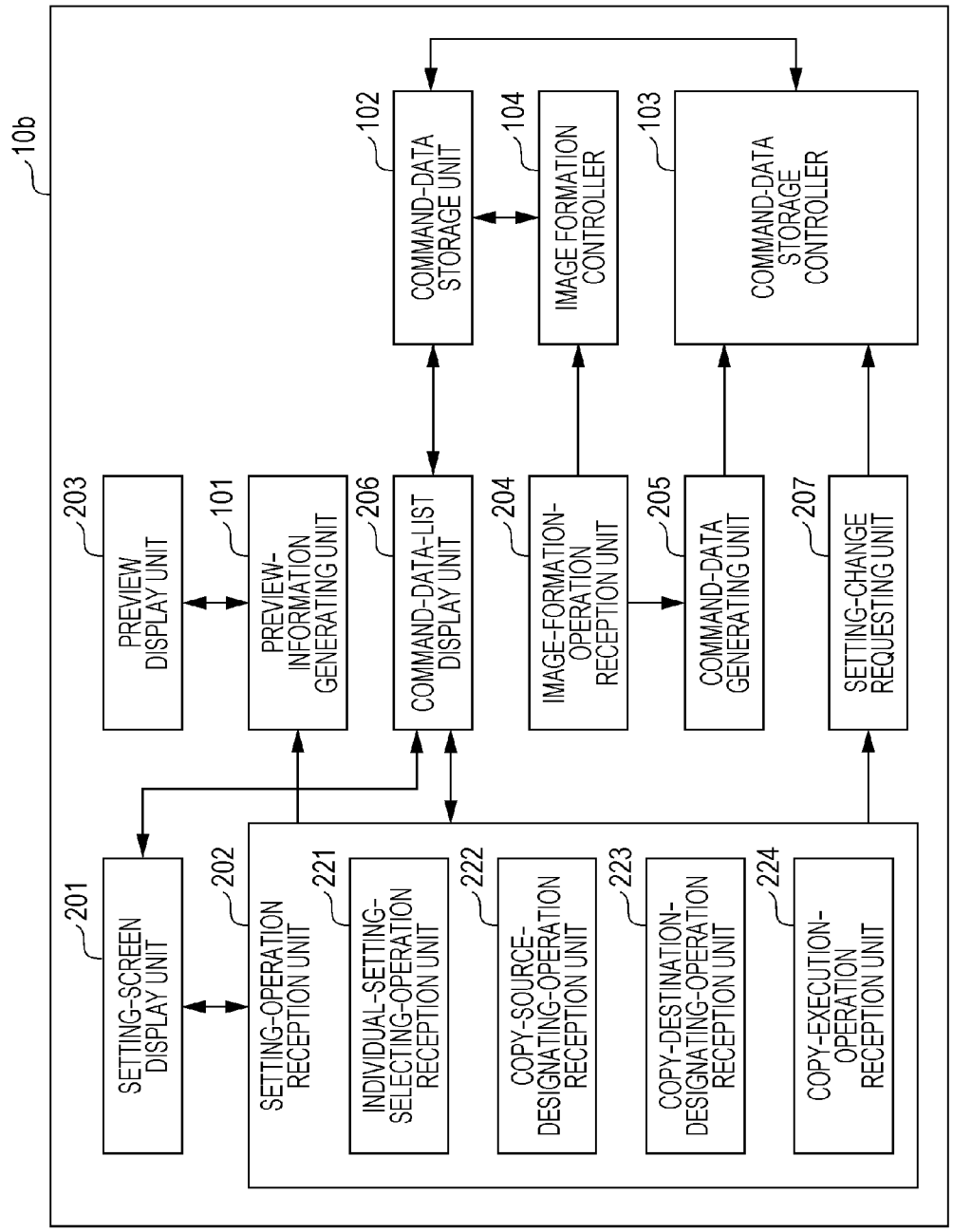
FIG. 27 illustrates an example of a functional configuration according to a modification.

FIG. 27 illustrates an example of a functional configuration according to this modification. In the example in FIG. 27, an image processing unit 10b that includes the units included in the client terminal 2 in addition to the units included in the image processing unit 10 shown in FIG. 3 is illustrated. In this case, the user views a screen displayed on the operation panel unit 20 included in the image forming apparatus 1 instead of the client terminal 2 so as to operate the operation panel unit 20.

2.6. Linkage of Settings

In a case where the settings are copied from the copy source to the copy destination, a change in one setting may be linked with the other setting. The term "link" used here implies that when there is a change in one setting, the other setting is similarly changed. In this case, for example, when the command-data storage controller 103 causes the settings of the copy source to be overwritten and stored over the settings of the copy destination, the command-data storage controller 103 causes information for specifying the settings of the copy counterpart (i.e., the copy destination for the copy source or the copy source for the copy destination) to be stored in association with both of the copy source and the copy destination.

Subsequently, when the settings are changed, if the information for specifying the settings of the copy counterpart is stored in association with the changed settings, the command-data storage controller 103 cause the settings of the copy counterpart specified by the information to be overwritten and stored over the changed settings. Thus, for example, when the settings of the copy source are changed, the settings of the copy destination may be matched with those of the copy source even if the user does not perform an operation.

2.7. Copying of Address of Settings

When copying the settings, an address of a storage region in which the settings are stored may be copied. In this case, instead of causing the settings of the copy source to be overwritten and stored over the settings indicated by the command data serving as the copy destination, the command-data storage controller 103 causes an address, at which the settings of the copy source are stored, to be stored in association with the settings indicated by the command data serving as the copy destination.

Then, if an address is stored in association with the settings indicated by the read command data, the image formation controller 104 performs image formation control with respect to those settings by using the settings stored at that address. Furthermore, instead of reading command data indicating the settings of the copy source and copying the settings onto a clipboard, the command-data storage controller 103 may write the address for those settings onto the clipboard.

In that case, the command-data storage controller 103 reads the address instead of reading the settings of the copy source from the clipboard, and causes the read address to be stored in association with the settings of the copy destination. By storing the address in association with the settings of the copy destination in place of the settings of the copy source in this manner, when the settings of the copy source are changed, the changed settings are used as the settings of the copy destination even if the user does not perform an operation.

2.8. Copying of Multiple Settings

An operation for collectively copying multiple settings may be used. For example, the user performs an operation for selecting multiple pieces of command data indicating the settings of copy sources, an operation for selecting the same number of pieces of command data serving as copy destinations, and an operation for commanding collective copying of these settings. When these operations are performed, for example, the command-data storage controller 103 copies the settings by combining multiple pieces of command data selected in the same sequential order. Accordingly, the time and effort spent for the operations when performing multiple copying processes may be reduced.

2.9. Category of Exemplary Embodiment of Present Invention

In addition to an image processing device that processes an image like the image processing unit 10, an exemplary embodiment of the present invention may be regarded as an image forming apparatus that includes the image processing device and an image forming unit, or may be regarded as an image forming system having a device serving as a user interface, like the client terminal 2, added to an image forming apparatus. Furthermore, an exemplary embodiment of the present invention may be regarded as an image processing method for realizing the processes performed by the devices, or may be regarded as a functional program for causing a computer to control the devices. This program may be provided in the form of a storage medium storing the program, such as an optical disk, or may be made usable by being downloaded and installed into a computer via a communication line, such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
a memory that stores a setting of an image forming process in accordance with generation of a first image formation command or an input of a command for generating the first image formation command; and
a storage controller that causes a first operation to be performed using a first object and a second operation different from the first operation to he performed using a second object different from the first object, a setting value corresponding to a second setting that is designated as a result of the second operation is rewritten to a setting value corresponding to a first setting that is designated as a result of the first operation, the first setting and the second setting being included in the stored setting, wherein the second setting is a setting of command data serving as a copy destination and the first setting is a setting serving as a copy source, an output unit that outputs a difference between the first setting and the second setting, wherein the first operation includes an operation for designating the first setting indicating the output difference, and wherein the second operation includes an operation for designating the second setting indicating the output difference.

2. The image processing device according to claim 1, wherein the first operation includes an operation for selecting an image indicating the first setting and for displaying an operation menu and an operation for selecting an item indicating copying of data onto a clipboard from the displayed operation menu, wherein the second operation includes an operation for selecting an image indicating the second image formation command and for displaying an operation menu, and wherein when an item indicating pasting of the data copied on the clipboard is selected from the operation menu displayed as a result of the second operation, the storage controller reads the first setting from the clipboard and causes the first setting to be overwritten and stored over the second setting.

3. The image processing device according to claim 1, wherein the first setting is a setting with respect to any one of a command in a pending status, a command in a stand-by status, a command stored as a template, and a past-executed command, the commands being included in the first image formation command.

4. The image processing device according to claim 1, wherein the image processing device operates in a first mode in which the storage
controller causes the first setting to be overwritten and stored without the output unit outputting the difference if the difference exists, and operates in a second mode in which the storage controller causes the first setting to be overwritten and stored after an operation for authorizing overwriting of the difference output from the output unit is performed if the difference exists.

5. The image processing device according to claim 1, wherein the first setting includes settings of a plurality of items, and
wherein the storage controller does not allow a setting of a specific item included in the plurality of items to be overwritten and stored.

6. An image forming apparatus comprising: the image processing device according to claim 1; and an image forming unit that forms an image onto a medium.

7. An image processing method comprising:
storing a setting of an image forming process in accordance with generation of a first image formation command or an input of a command for generating the first image formation command; and
causing a first operation to be performed using a first object and a second operation different from the first operation to be performed using a second object different from the first object and causing a setting value corresponding to a second setting that, is designated as that is designated as a result of the first operation the first setting and the second setting being included in the stored setting,
wherein the second setting is a setting of command data serving as a copy destination and the first setting is a setting serving as a copy source, an output unit that outputs a difference between the first setting and the second setting, wherein the first operation includes an operation for designating the first setting indicating the output difference, and wherein the second operation includes an operation for designating the second setting indicating the output difference.

\* \* \* \* \*